United States Patent
Jindal et al.

(10) Patent No.: US 9,379,790 B2
(45) Date of Patent: Jun. 28, 2016

(54) CROSS CELL BEAM PERSISTENCE IN A MASSIVE MULTIPLE-INPUT, MULTIPLE OUTPUT (MIMO) ENVIRONMENT

(71) Applicant: Broadcom Corporation, Irvine, CA (US)

(72) Inventors: Nihar Jindal, Mountain View, CA (US); Murat Mese, Rancho Palos Verdes, CA (US); Arogyaswami Paulraj, Stanford, CA (US); Louay Jalloul, San Jose, CA (US); Amin Mobasher, Menlo Park, CA (US); Sam Alex, Sunnyvale, CA (US)

(73) Assignee: Broadcom Corproation, Irvine, CA (US)

( * ) Notice: Subject to any disclaimer, the term of this patent is extended or adjusted under 35 U.S.C. 154(b) by 85 days.

(21) Appl. No.: 14/142,581

(22) Filed: Dec. 27, 2013

(65) Prior Publication Data

US 2015/0162959 A1    Jun. 11, 2015

Related U.S. Application Data

(60) Provisional application No. 61/914,893, filed on Dec. 11, 2013, provisional application No. 61/811,563, filed on Apr. 12, 2013.

(51) Int. Cl.
| | |
|---|---|
| *H04B 7/04* | (2006.01) |
| *H04B 7/02* | (2006.01) |
| *H04B 7/06* | (2006.01) |
| *H04W 16/28* | (2009.01) |
| *H04W 72/04* | (2009.01) |

(52) U.S. Cl.
CPC .............. *H04B 7/0413* (2013.01); *H04B 7/024* (2013.01); *H04B 7/0617* (2013.01); *H04W 16/28* (2013.01); *H04W 72/046* (2013.01)

(58) Field of Classification Search
CPC .............................. H04W 80/04; H04W 36/18
USPC ......................................................... 370/331
See application file for complete search history.

(56) References Cited

U.S. PATENT DOCUMENTS

| | | | | |
|---|---|---|---|---|
| 8,358,624 | B1 * | 1/2013 | Ghaus et al. .................. | 370/331 |
| 2004/0224691 | A1 * | 11/2004 | Hadad ............................ | 455/442 |
| 2010/0103835 | A1 * | 4/2010 | Sung et al. .................... | 370/252 |
| 2010/0142477 | A1 * | 6/2010 | Yokota .......................... | 370/331 |
| 2012/0076102 | A1 * | 3/2012 | Ko ....................... | H04B 7/0689 370/329 |
| 2012/0157103 | A1 * | 6/2012 | Frenger et al. ................ | 455/437 |
| 2013/0028341 | A1 * | 1/2013 | Ayach et al. ................... | 375/267 |
| 2013/0143578 | A1 * | 6/2013 | Lekutai ............. | H04W 36/0083 455/444 |

(Continued)

*Primary Examiner* — Melvin Marcelo
*Assistant Examiner* — Peter Solinsky
(74) *Attorney, Agent, or Firm* — Sterne, Kessler, Goldstein & Fox P.L.L.C.

(57) ABSTRACT

In wireless operating environments, wireless user devices are often within the coverage area of multiple base stations. The base station providing the best uplink for the user device may be different than the base station providing the best downlink for the user device. Systems and techniques for asymmetric uplink and downlink communications for a user device are provided. In embodiments, the user device initially synchronizes with a base station. Both the uplink and downlink are initially served by this base station. A determination is then made whether to handoff the downlink for the user device to another base station. When a determination is indicated, the downlink is handed off to the second base station. Thereafter, periodic measurements are made. The determinations whether to handoff the uplink and downlink for the user device are made independently.

20 Claims, 4 Drawing Sheets

(56) References Cited

U.S. PATENT DOCUMENTS

| | | | | |
|---|---|---|---|---|
| 2013/0308473 A1* | 11/2013 | Sun et al. | | 370/252 |
| 2014/0064237 A1* | 3/2014 | Lee | | H04L 5/0055 370/329 |
| 2014/0120928 A1* | 5/2014 | Dimou | | H04W 16/08 455/452.1 |
| 2014/0161109 A1* | 6/2014 | Sung et al. | | 370/336 |
| 2014/0169197 A1* | 6/2014 | Damnjanovic | | H04W 48/18 370/252 |
| 2014/0198744 A1* | 7/2014 | Wang | | H04B 7/0617 370/329 |
| 2014/0204856 A1* | 7/2014 | Chen | | H04L 5/0053 370/329 |
| 2014/0294107 A1* | 10/2014 | Shin | | H04B 7/0456 375/267 |
| 2014/0301293 A1* | 10/2014 | Geirhofer | | H04B 7/0626 370/329 |
| 2014/0334440 A1* | 11/2014 | Wong | | H04W 36/0011 370/331 |
| 2015/0098392 A1* | 4/2015 | Homchaudhuri et al. | | 370/329 |

* cited by examiner

CROSS CELL BEAM PERSISTENCE IN A MASSIVE MULTIPLE-INPUT, MULTIPLE OUTPUT (MIMO) ENVIRONMENT

CROSS REFERENCE TO RELATED APPLICATIONS

This application claims the benefit of U.S. Provisional Patent Application No. 61/914,893, filed Dec. 11, 2013, which is incorporated by reference herein in its entirety. This application also claims the benefit of U.S. Provisional Patent Application No. 61/811,563 filed Apr. 12, 2013.

FIELD OF THE INVENTION

The present disclosure relates generally to wireless communications including systems using massive multiple-input, multiple output (MIMO).

BACKGROUND

Wireless networks have evolved from base stations having a single antenna to systems having multiple antennas, referred to as multiple input output (MIMO). A base station and/or user device may have MIMO capabilities. Recently, base stations have further evolved to support massive MIMO. A massive MIMO base station has a large number antennas (often 100 or more).

A MIMO or M-MIMO base station may use beam forming to transmit signals on the downlink to one or more user devices. In general, beam forming is shaping of an antenna beam by multiple transmit antennas in the direction of a target receiver. Beam forming can increase the signal strength at the receiver proportional to the number of transmit antennas. One benefit of massive MIMO is the increased gain that can be achieved through the use of a large number of antennas to transmit a beam formed signal on the downlink.

BRIEF DESCRIPTION OF THE DRAWINGS/FIGURES

Figure 1:
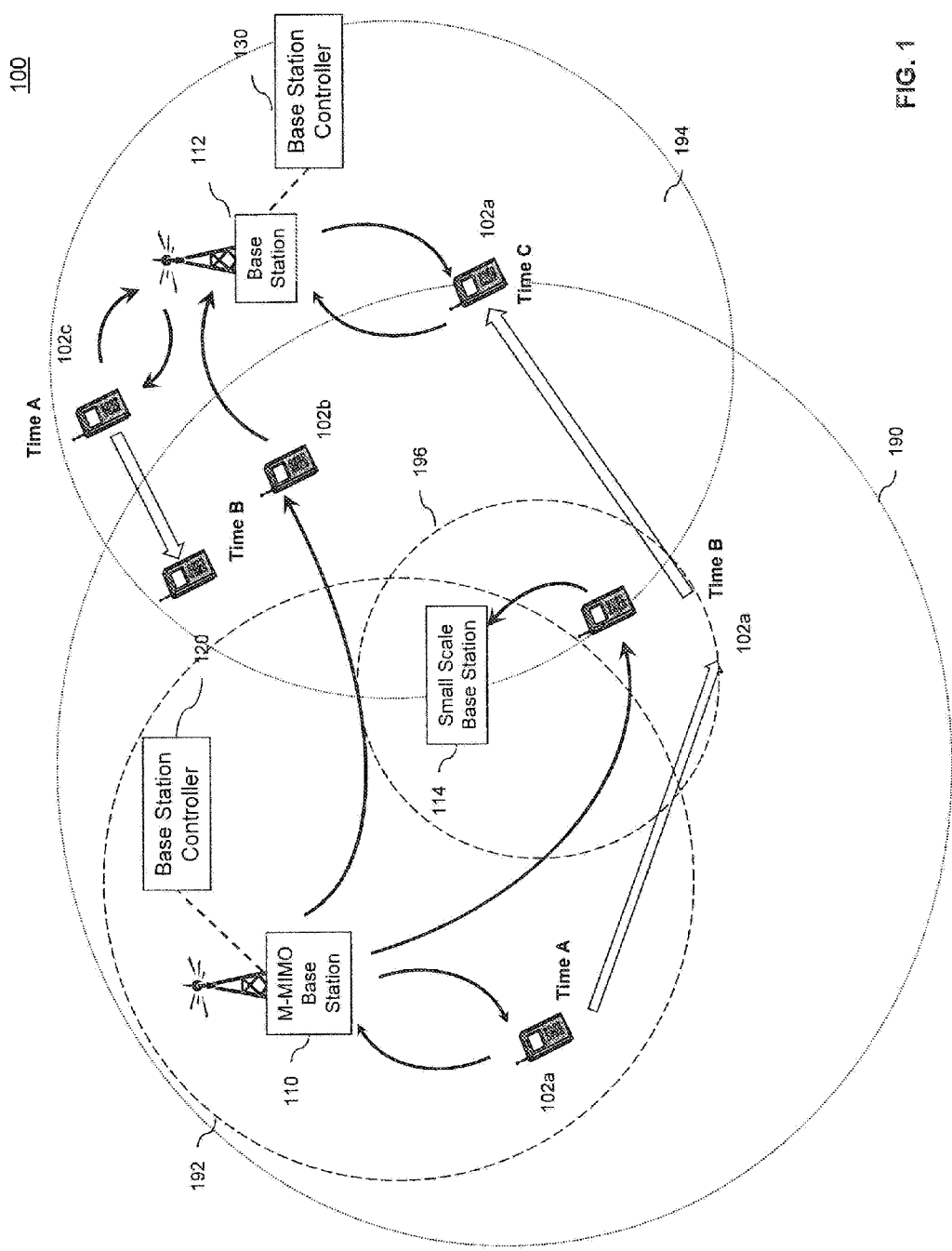
FIG. 1 depicts an exemplary operating environment for a system for cross cell beam persistence with M-MIMO, according to embodiments of the present disclosure.

The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

Communications between a base station (or eNB) and a user device utilizes two links—an uplink and a downlink. The uplink is the transmission path between the user device and the base station (or eNB). The downlink is the path between the base station (or eNB) and the user device. Traditionally, a user device is connected on the uplink and downlink to the base station (or eNB) that is closest in distance to the user device. When the user device leaves the coverage area of the base station (or eNB), both the uplink and downlink are handed off at the same time to a new serving base station (eNB).

Generally, the reach of the downlink depends primarily on distance, transmit power and number of antennas whereas the reach of the uplink depends primarily on distance and number of antennas. The increase in transmit power and number of antennas has allowed a massive MIMO (M-MIMO) base station to have a larger reach, particularly on downlink channels. Therefore, in a system having M-MIMO base stations and non M-MIMO base stations, the uplink and downlink may be asymmetric. That is, the base station that provides the strongest uplink can be different than the base station that provides the strongest downlink. This scenario can also occur in systems without M-MIMO. For example, in a heterogeneous network, macro cells are of high power and small cells are much lower in power. In this example, the base station providing the best uplink may be different than the base station providing the best downlink. This asymmetry between uplink and downlink is one motivation for cross cell beam persistence.

M-MIMO may be single user (SU) and/or multi-user (MU). When SU, the SU beam can be maintained well beyond a normal cell boundary associated with a M-MIMO base station into and possibly through and beyond a cell boundary of a second neighboring base station using the techniques described herein. MU transmission involves forming multiple beams for multiple users. When MU transmission used, one or more of the MU beams may be extended beyond the normal cell boundary associated with the M-MIMO base station using the techniques described herein.

the area defined by the uplink between the user device and the base station (or eNB) and by the downlink between the base station (eNB) and user device can be considered or referred to as a "regions" for ease of discussion. These uplink and downlink regions can be very dynamic and user specific. For example, the base station serving the downlink for a UE depends on the instantaneous channel to that base station and other base stations. The instantaneous channel is time varying and not completely determined by the UE's location. The downlink beam formed pathway for a base station (or eNB) can extend beyond the uplink region for the base station (or eNB) into the uplink region for another base station (or eNB). As described in detail below, this allows handovers of the uplink and the downlink to be handled separately.

FIG. 1 depicts an exemplary operating environment 100 for a system for cross cell beam persistence, according to embodiments of the present disclosure. Environment 100 includes a M-MIMO base station 110, one or more non-MIMO base stations 112, one or more small scale base stations 114 and one or more optional base station controllers 120/130. As would be appreciated by a person of ordinary skill in the art, an exemplary system can have any number of M-MIMO base stations, any number of non-MIMO base stations, and any number of small scale base stations.

Figure 2:
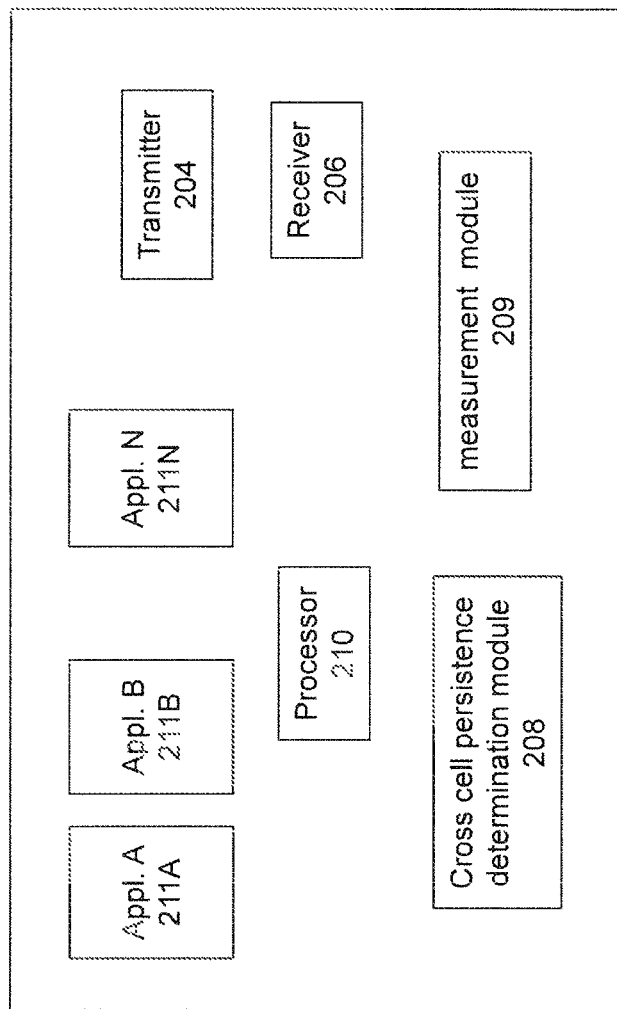
FIG. 2 depicts an exemplary user device (UE) for handling asymmetric uplink and downlink communications, according to embodiments of the present invention.

Environment 100 may also include a plurality of user devices UE 102a-n. UE 102 may be any type of device having wireless communications capability such as a mobile phone, laptop, PDA, etc. In embodiments, one or more UEs 102 supports MIMO (e.g., has multiple antennas for transmission and reception). FIG. 2, discussed in detail below, describes an exemplary UE, according to embodiments of the present disclosure.

Base station 110 is a M-MIMO base station. M-MIMO base station includes a large number of antenna elements (e.g., 100 or more). In an embodiment, the antenna elements of M-MIMO base station 110 are arranged in an N×N array (e.g., N=64). M-MIMO base station 110 has an uplink cell boundary 190. Because of its configuration. M-MIMO base station 110 has a long distance downlink cell boundary 192 (e.g., when SU or MU beam forming is used in for the downlink). As would be appreciated by a person of ordinary skill in the art, downlink cell boundaries are dynamic and may be user device (UE) specific. In an embodiment, M-MIMO base station 110 may be an evolved Node B (eNB). In this embodiment, the system may not have a separate base station controller 120.

Base station 112 is normal (non M-MIMO) base station. Base station 112 has an uplink/downlink coverage area 194. Note that in embodiments, the downlink coverage area of a non M-MIMO base station may be different than the uplink coverage area due to various considerations. As would be appreciated by a person of ordinary skill in the art, these coverage areas are also dynamic and may be user device (UE) specific. Base station 112 has a limited number of antenna elements (e.g., 2) and therefore has a limited range as compared to M-MIMO base station 110.

Base station 114 is a small scale base station such as a femtocell, Home Node B (HNB), or a picocell. Small scale base station 114 is typically used in an indoor environment such as a home or small business. Small scale base station 114 has an uplink/downlink coverage area 196. The coverage area 196 for small scale base station 114 is smaller than the coverage areas for base station 112 and M-MIMO base station 110.

Operating environment 100 may include one or more base station controllers 120/130. Base station controller 120 is coupled to a base station, such as M-MIMO base station 110. In embodiments, base station 120 is further coupled to other base stations such as base station 112. Similarly, base station 112 may also have a base station controller 130.

In embodiments, base station controller 120/130 is configured to periodically determine whether the base station serving the uplink and/or downlink for a user device should be maintained or whether the uplink and/or downlink should be handed off to a new serving base station. When the base station controller 120/130 determines that either the uplink and/or downlink should be handed off, base station controller 120/130 initiates the handoff procedure. In embodiments, this functionality is incorporated into the base station or eNB. Further details regarding the procedure for determining whether to handoff an uplink and/or downlink are described below and in FIG. 3.

In an example embodiment, M-MIMO base station 110 tracks and services a downlink flow to UE 102a via beam forming. At time A, base station 110 also services the uplink from UE 102a. At time B, UE 102a migrates into a region of a neighboring small cell base station 114. As UE 102a migrates into cell boundary 196, a handoff of the uplink to small scale base station 114 occurs. The downlink is maintained with M-MIMO base station 110. With continued roaming, at time C, UE 102a migrates into a region covered by cell boundary 194 of base station 112. At time C, both the downlink beam forming of base station 110 and the uplink of base station 114 for UE 102a can both be handed over to base station 112.

In another example, UE 102b is stationary during times A-C. However, due to its location, the uplink for UE 102b is serviced by non M-MIMO base station 112 and the downlink is serviced by M-MIMO base station base station 110. In a further example, non M-MIMO base station 112 services both the uplink and downlink for UE 102c. At time B, UE 102c migrates to a location within the downlink reach of M-MIMO base station 110 and the downlink reach of non M-MIMO base station 112. At time B, a determination may be made to handoff the downlink from non M-MIMO base station 112 to M-MIMO base station 110.

FIG. 2 depicts an exemplary user device (UE) 202 for handling asymmetric uplink and downlink communications, according to embodiments of the present disclosure. UE 202 includes a transmitter 204, receiver 206, and a processor 210.

Transmitter 204 is configured to process and transmit signals to one or more base stations on uplink channels. Receiver 206 is configured to receive and process signals from one or more base stations on downlink channels. In embodiments, UE 202 includes multiple antennas and is configured to operate as a MIMO UE. In these embodiments, additional circuitry may be included to handle MIMO communications, as would be appreciated by a person of ordinary skill in the art.

Processor 210 is configured to execute one or more applications 211A. Applications 211 may be any software configured to run on a UE such as voice communications, email applications, audio applications, games, video streaming applications, etc.

UE 202 may also include a measurement module 209. Measurement module 209 is configured to obtain downlink measurements associated with signals from base stations within its range. For example, measurement module 209 may measure the received power of a reference signal from each detected base stations (base stations within range of the UE). These downlink measurements may be stored at UE 102. Measurement module 209 may further obtain uplink channel information transmitted from base stations. Measurement module 209 may also store this information at UE 102.

UE 202 may further include a cross cell persistence determination module 208. Cross cell persistence determination module 208 is optional. In embodiments, determination of whether to maintain or handoff the uplink and/or downlink is controlled by the UE instead of an element in the network. In these embodiments, cross cell persistence determination module 208 is configured to periodically determine whether the base station serving the uplink and/or downlink for a user device should be maintained or whether the uplink and/or downlink should be handed off to a new serving base station.

When the cross cell persistence determination module 208 determines that either the uplink and/or downlink should be handed off, cross cell persistence determination module 208 initiates the handoff procedure. Further details regarding the procedure for determining whether to handoff an uplink and/or downlink are described below in FIG. 3.

Figure 3:
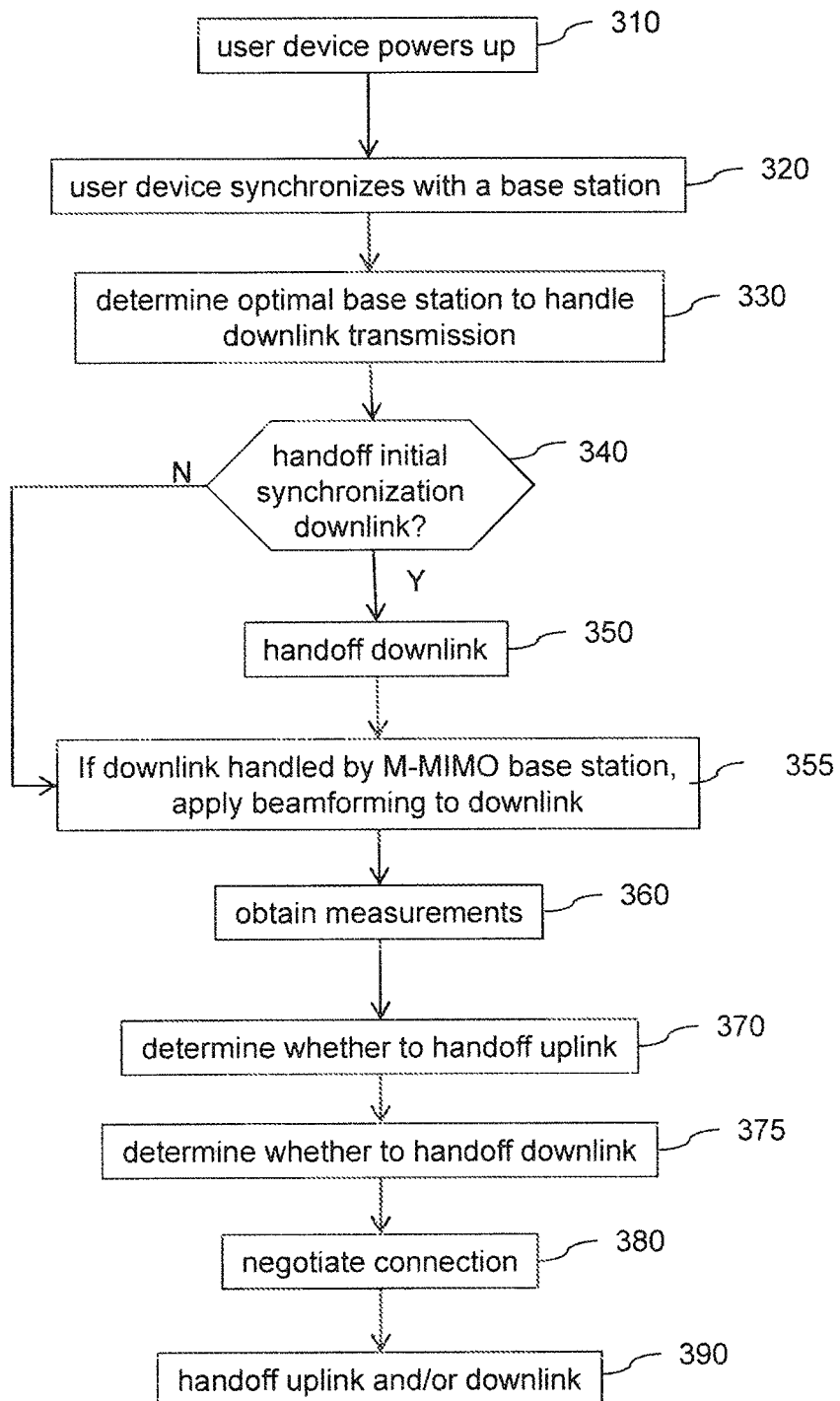
FIG. 3 depicts a flowchart of a method for cross cell beam persistence with massive MIMO, according to embodiments of the present invention.

FIG. 3 depicts a flowchart 300 of a method for cross cell beam persistence with M-MIMO, according to embodiments of the present disclosure. FIG. 3 is described with continual reference to the embodiments of FIGS. 1 and 2. However, flowchart 300 is not limited to those embodiments.

In step 310, the user device powers up. For example, user device 102a and/or user device 102b of FIG. 1 powers up. After powering up, the user device performs a cell search. A cell search has multiple components including acquisition of frequency, symbol synchronization to a cell, acquisition of frame timing of a cell, and determination of the identity of the cell.

In step 320, the user device 102a synchronizes with a base station. For example, in an LTE system, two synchronization signals are transmitted on a downlink—a primary synchronization signal (PSS) and a secondary synchronization signal (SSS). When the user device detects and identifies the PSS, it has obtained timing for the cell, cell identity, and location of SSS. The SSS provides frame timing. Once frame timing and cell identity are obtained, the user device has identified the reference signal for the cell. This reference signal is then used to perform channel estimation and other functions.

At the time of initial synchronization, both the downlink and uplink for the user device are served by the same base station. The initial synchronization is performed in an open-loop, non-beamformed manner. The received signal strength the UE gets from base stations during initial synchronization may be quite different than what the UE receives during beam formed data transmissions. However, beam forming only occurs after a UE associates with a base station. That is, non-beamformed synchronization signals are used to decide which base station to associate with, then a UE may receive beam formed signals for the associated base station if the base station has MIMO capabilities.

For example, in FIG. 1, user device 102a initially synchronizes (at time A) with M-MIMO base station 110. User device 012b, in contrast, initially synchronizes with non M-MIMO base station 112. At initial synchronization, the downlink and uplink for user device 102a are served by M-MIMO base station 110 and the downlink and uplink for user device 102b are served by non M-MIMO base station 112.

In step 330, a determination of the optimal base station to handle downlink transmission and uplink transmission is made for the user device. For example, the base station controller for non M-MIMO base station 112 has knowledge that a M-MIMO base station (e.g., M-MIMO base station 110) is in proximity to non M-MIMO base station 112. In this embodiment, a determination is made whether user device is within the downlink transmission coverage area 190 of M-MIMO base station 110. This determination may be made through measurements taken by the user device. Alternatively, the network (e.g., base station controller) can estimate the position of the user device and determine based on the position information whether the user device is within the downlink transmission coverage area 190 of M-MIMO base station 110.

For example, in FIG. 1, base station controller 130 determines that user device 102b is within the downlink communications coverage area 190 of M-MIMO base station 110.

In step 340, a determination is made whether to handoff the initial synchronization downlink based on the determination of step 330. If it is determined that downlink should be handed off, operation proceeds to step 350. If it is determined that downlink should not be handed off, operation proceeds to step 360. For example, if a UE is initially synchronized on the downlink to a non-M-MIMO base station and the determination is made in step 330 that the downlink should be handled by the M-MIMO base station, the downlink is handed off from the non-M-MIMO base station to the M-MIMO base station.

In step 350, the downlink is handed off. For example, in FIG. 1, the downlink for user device 102b is handed off to M-MIMO base station 110. The downlink for user device 102a remains with M-MIMO base station 110 and the downlink for user device 102c remains with base station 112.

In step 355, when the downlink is served by a M-MIMO base station, beam forming is applied for the user device. That is, multiple antennas at the M-MIMO base station 110 are used to shape the overall beam in the direction of the user device. Beam forming increases the strength of the downlink signal. The increase is related to the number of antennas used to transmit the signal.

Following initial steps 310-355, the system periodically performs steps 360-375—obtaining additional measurements and determining whether to handoff the uplink and/or downlink.

In step 360, measurements are obtained.

In a first embodiment, the UE takes measurements associated with signals from base stations within its range. For example, the user device suspends communications with its serving base station. The user device then searches for neighboring cells. When a neighboring cell is identified, the user device synchronizes to that cell and performs measurements. The user device may measure the received power of the reference signal for that cell. The user device repeats measurements for the neighboring cells that it detects. The user device then transmits these measurements to its serving base station.

For example, at time B, UE 102a of FIG. 1 measures downlink signals from M-MIMO base station 110, base station 112 and small scale base station 114.

In an additional or alternative embodiment, the UE is configured to transmit one or more sounding reference signals on the uplink. A sounding reference signal allows a base station to estimate uplink channel and interference at various frequencies. A sounding reference signal may further be used as a factor to estimate the downlink channel.

In a further additional embodiment, one or more base stations transmit their transmit power in a system information broadcast. This information can be used to estimate the uplink channel.

In an embodiment, the measurements of step 360 are non beamformed measurements. However, in an additional embodiment, described in further detail in step 440 of FIG. 4 below, the UE could request that base stations having MIMO capabilities transmit a beamformed signal. In this embodiment, the UE measurements can be made on beamformed signals.

In step 370, a determination is made, based on measurements obtained in step 360, whether to handoff the uplink. This determination may be made based on a number of factors including distance and number of antennas. For example, the determination may be made using power measurements of the uplink (e.g., from the user device sounding reference signals) and the estimated path loss between the base station and the user device. The path loss is a characteristic of distance between the user device and the base station. For example, the following equation could be used:

$$RSSI_{uplink} = P_{Tx\text{-}UE} - P_{loss}$$

In the example of FIG. 1, at time B, a determination is made whether to handoff uplink of UE 102a from M-MIMO base station 110 to small scale base station 114. In this example, the network (e.g., base station controller 120) uses information about the uplink channel such as received through sounding reference signals from UE 102a. The determination compares various factors associated with the uplink for various available base stations. The network may use the following equations in this example:

$$RSSI_{102a \to 110}(\text{time } B) = P_{tx102a \to 110}(20 \text{ dBW}) - P_{L110 \to 102a}(70 \text{ dBW}) = -50 \text{ dBW}$$

$$RSSI_{102a \to 114}(\text{time } B) = P_{tx102z \to 114}(1 \text{ dBW}) - P_{L114 \to 102a}(60 \text{dBW}) = -59 \text{ dBW}$$

In this example, a determination is made to handoff the uplink of UE 102a at time B to small scale base station 114.

In step 375, a determination is made, based on measurements obtained in step 360, whether to handoff the downlink. This determination may be made based on a number of factors including dynamic channel beam forming distance, $T_x$ power, downlink signal strength, traffic load on base station, and/or number of antennas. For example, the following equation could be used:

$$RSSI_{downlink} = P_{base\ station} - P_{loss}$$

That is, the downlink is converted to an uplink RSSI accounting for base station power level.

$$RSSI_{downlink} - P_{base\ station} = P_{loss}$$

The downlink channel is then selected as the downlink having the minimum path loss which is equivalent to maximum RSSI_uplink.

In an embodiment, the determination of whether to handoff the uplink and/or downlink is network-controlled. In this embodiment, a base station controller in the network makes the determination whether to handoff the uplink and/or downlink. In this embodiment, the measurements relative to the downlink may be based on the UE measurements taken by the UE and transmitted to the base station. The measurements relative to the uplink may be based on measurements made from sounding reference signals and/or information available in the network.

In an additional or alternative embodiment, the user device makes the determination whether to handoff the downlink. In this embodiment, the user device maintains downlink channel measurements taken during the measurement step. Uplink channel measurements are received from the base station in transmitted system broadcast information.

In the example of FIG. 1, at time B, a determination is made to maintain the downlink for UE 102a with M-MIMO base station 110. That is, at time B, the downlink for UE 102a is served by M-MIMO base station 110 and the uplink for UE 102a is served by small scale base station 114. Also, at time B, a determination is made to handoff the downlink for UE 102c to M-MIMO base station 110. At time B, the downlink for UE 102c is served by M-MIMO base station 110 and the uplink is served by base station 112.

At time C, UE 102a has moved farther from M-MIMO base station 110. At time C, a determination is made to handoff the uplink from small scale base station 114 to base station 112 and to handoff the downlink from M-MIMO base station 110 to base station 112. That is, at time C, the downlink and uplink for UE 102a is served by base station 112.

In step 380, connection negotiation occurs. This step is optional. When present, if a determination is made in step 375 that the downlink is to be handed off from a M-MIMO base station to a non M-MIMO base station or maintained at the non M-MIMO base station, the user device or network may initiate negotiation with the M-MIMO base station to retain or obtain the downlink. For example, if the number of antennas used for beam forming is increased, the M-MIMO base station would be designated for the downlink. The M-MIMO base station may agree to increase the number of antennas. Therefore, the determination made in step 375 may be altered as a result of the negotiation.

In step 390, if handoff is indicated, the downlink and/or uplink for a UE are handed off.

Figure 4:
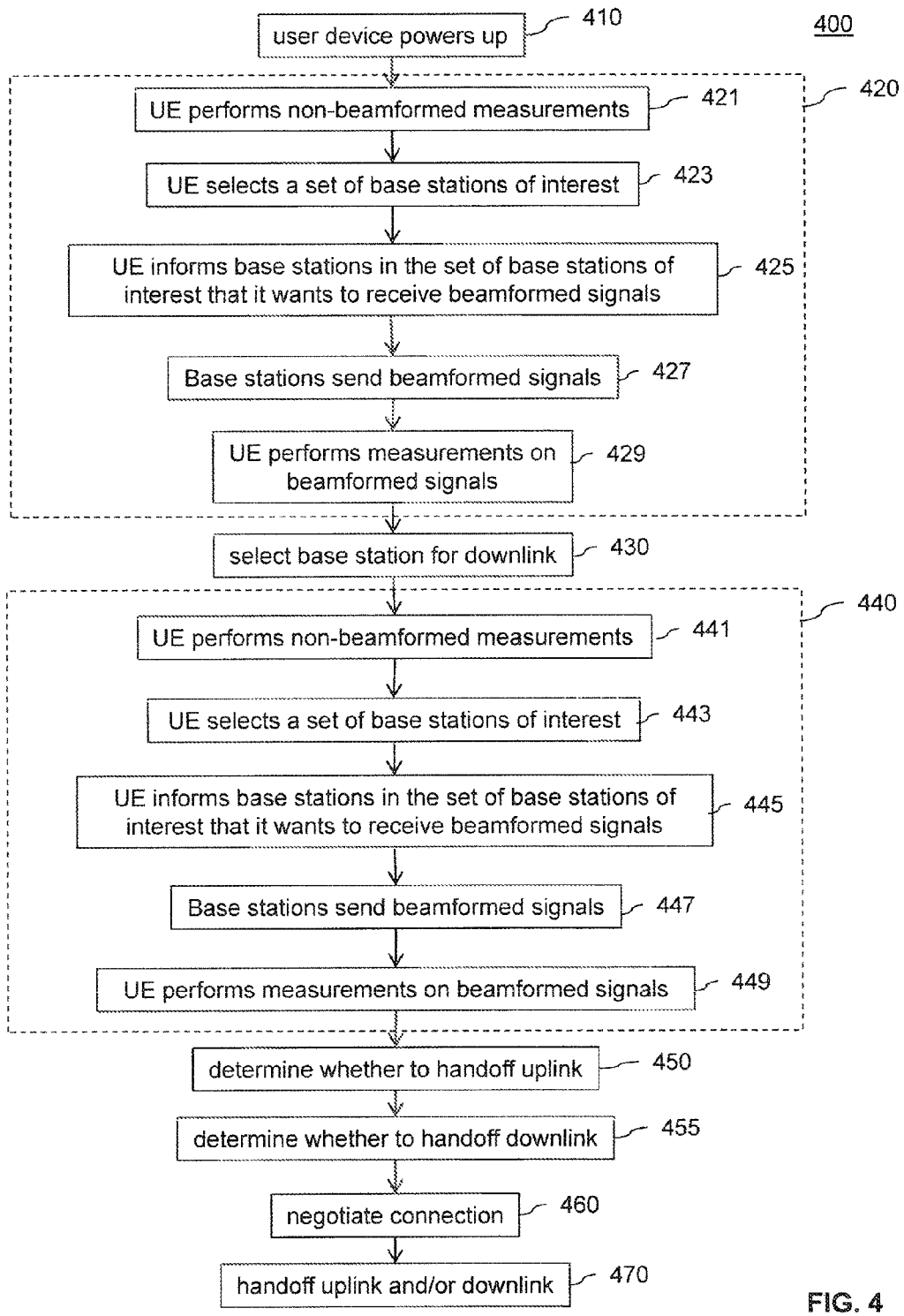
FIG. 4 depicts a flowchart of a method for cross cell beam persistence using beamformed measurements, according to embodiments of the present disclosure.

FIG. 4 depicts a flowchart 400 of a method for cross cell beam persistence using beamformed measurements, according to embodiments of the present disclosure. FIG. 4 is described with continual reference to the embodiments of FIGS. 1 and 2. However, flowchart 400 is not limited to those embodiments.

In step 410, the user device (UE) powers up. For example, user device 102a and/or user device 102b of FIG. 1 powers up.

In step 420, initial synchronization is performed. Step 420 includes steps 421-429.

In step 421, the UE performs measurements. The measurements of step 421 are non beamformed measurements.

In step 423, based on the non beamformed measurements, the UE selects a set of base stations of interest. For example, the UE may select a set of 5 to 10 base stations that it received signals from during initial synchronization measurement period. In the example of FIG. 1, at Time B. UE 102a may receive signals from M-MIMO base station 110, small scale base station 114, and non M-MIMO base station 112.

In step 425, the UE informs the base stations in the set of base stations of interest that it wants to receive beamformed signals.

In step 427, all or a portion of the base stations in the set of base stations transmit beamformed signals. As would be appreciated by a person of skill in the art, a base station may not be capable of transmitting beamformed signals. If a base station is not capable of transmitting beamformed signals, the base station can transmit non beamformed signals. In the example of FIG. 1, small scale base station 114 may not be capable of transmitting beamformed signals.

In step 429, the UE performs measurements on the beamformed signals. In addition, the UE may transmit the measurements to the network.

In step 430, a base station is selected for the downlink. In an embodiment, the UE may select a base station based on beamformed measurements. In an alternate embodiment, an element in the network may select the base station for the downlink. In this step, the UE also synchronizes to the selected base station.

Following initial steps 410-430, the system periodically performs steps 440 through 470—obtaining additional measurements and determining whether to handoff the uplink and/or downlink.

In step 440, additional measurements are obtained. Step 440 includes steps 441-449.

In step 441, the UE performs measurements. The measurements of step 441 are non beamformed measurements. For example, at Time C, UE 102a may receive signals from M-MIMO base station 110 and from non M-MIMO base station 112.

In step 443, based on the non beamformed measurements, the UE selects a set of base stations of interest. For example, the UE may select a set of 5 to 10 base stations that it received signals from during initial synchronization measurement period.

In step 445, the UE informs the base stations in the set of base stations of interest that it wants to receive beamformed signals.

In step 447, all or a portion of the base stations in the set of base stations transmit beamformed signals. As would be appreciated by a person of skill in the art, a base station may not be capable of transmitting beamformed signals. If a base station is not capable of transmitting beamformed signals, the base station can transmit non beamformed signals.

In step 449, the UE performs measurements on the beamformed signals. In addition, the UE may transmit the measurements to the network.

In step 450, a determination is made, based on measurements obtained in step 440, whether to handoff the uplink. Step 450 was described above in step 370 of FIG. 3.

In step 455, a determination is made, based on measurements obtained in step 440, whether to handoff the downlink.

In step 460, connection negotiation occurs. This step is optional. When present, if a determination is made in step 355 that the downlink is to be handed off from a M-MIMO base station to a non M-MIMO base station or maintained at the non M-MIMO base station, the user device or network may initiate negotiation with the M-MIMO base station to retain or obtain the downlink. For example, if the number of antennas used for beam forming is increased, the M-MIMO base station would be designated for the downlink. The M-MIMO base station may agree to increase the number of antennas. Therefore, the determination made in step 455 may be altered as a result of the negotiation.

In step 470, if handoff is indicated, the downlink and/or uplink for a UE are handed off.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include non-transitory machine-readable mediums such as read only memory (ROM); random access memory (RAM); magnetic disk storage media; optical storage media; flash memory devices; and others. As another example, the machine-readable medium may include transitory machine-readable medium such as electrical, optical, acoustical, or other forms of propagated signals (e.g., carrier waves, infrared signals, digital signals, etc.). Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Although the Figures described throughout the present disclosure describe interoperation between various elements, no connections or couplings are shown between these elements for clarity. As will be appreciated by those of ordinary skill in the art, the elements illustrated in FIGS. 1-2 may be coupled to one another using any wired and/or wireless connections and may utilize any type and number of communication protocols to facilitate the described functionality without departing from the spirit and scope of the present disclosure.

What is claimed is:

1. A user device supporting cross cell beam persistence comprising:
 a transmitter configured to transmit over an uplink for the user device;
 a receiver configured to receive over a downlink for the user device; and
 a cross cell beam persistence determination module configured to select a first base station to service the uplink for the user device and to select a second base station, different from the first base station, to service the downlink for the user device based on the second base station increasing a number of antennas at the second base station used to service the downlink for the user device,
 wherein a downlink region defined by the downlink for the user device is extended into an uplink region defined by the uplink for the user device as the user device moves into the uplink region to maintain the downlink for the user device.

2. The user device of claim 1, further comprising:
 a measurement module configured to obtain downlink measurements for a set of base stations within range of the user device.

3. The user device of claim 2, wherein the cross cell beam persistence module is further configured to select the second base station to service the downlink for the user device based on the downlink measurements obtained by the measurement module.

4. The user device of claim 1, wherein the second base station is a massive multiple input multiple output (MIMO) base station.

5. The user device of claim 2, wherein the cross cell persistence module is further configured to select the second base station from the set of base stations based on the number of antennas used by base stations in the set of base stations to transmit downlink signals and a beam forming gain of the base stations in the set of base stations.

6. The user device of claim 5, wherein the cross cell persistence module is further configured to select the second base station from the set of base stations based on a load on base stations in the set of base stations.

7. The user device of claim 2, wherein the cross cell persistence determination module is further configured to negotiate with a base station in the set of base stations during the selection of the second base station.

8. The user device of claim 1, wherein the cross cell beam persistence determination module is further configured to select the first base station to service the uplink for the user device and to select the second base station, different from the first base station, to service the downlink for the user device in accordance with a periodic selection scheme.

9. The user device of claim 1, wherein the cross cell beam persistence determination module is further configured to send a sounding reference signal to base stations in the set of base stations.

10. A method for performing cross cell beam persistence in a user device, comprising:
 synchronizing with a first base station, wherein the first base station services both an uplink and a downlink for the user device;
 determining whether to handoff the uplink for the user device from the first base station to a second base station based on uplink measurements for base stations in a set of base stations within range of the user device;
 initiating handoff of the uplink to the second base station when a handoff of the uplink is indicated by the determining; and determining whether to handoff the downlink for the user device from the first base station to a third base station based on whether the first base station will increase a number of antennas at the first base station used to service the downlink for the user device, wherein a downlink region defined by the downlink for the user device is extended into an uplink region defined by the uplink for the user device as the user device moves into the uplink region to maintain the downlink for the user device.

11. The method of claim 10, wherein the first base station is a massive multiple input, multiple output (MIMO) base station.

12. The method of claim 10, further comprising;
performing downlink measurements for base stations in the set of base stations within range of the user device; and
initiating handoff of the downlink to the third base station when a handoff of the downlink is indicated by the determining whether to handoff the downlink for the user device from the first base station to the third base station.

13. The method of claim 12, wherein the second base station and the third base station are the same base station.

14. The method of claim 12, wherein determining whether to handoff the downlink further comprises determining whether to handoff the downlink for the user device from the first base station to the third base station based on the number of antennas used by base stations in the set of base stations to transmit downlink signals.

15. The method of claim 12, wherein determining whether to handoff the downlink further comprises determining whether to handoff the downlink for the user device from the first base station to the third base station based on a load on base stations in the set of base stations.

16. The method of claim 10, further comprising:
periodically repeating the determining to handoff the uplink and initiating steps.

17. The method of claim 10, wherein the first base station is a massive MIMO base station.

18. A method for performing cross cell beam persistence in a network element, comprising:
receiving uplink measurements for base stations in a set of base stations within range of a first base station that services both an uplink and a downlink for a user device; and
handing off the uplink for the user device from the first base station to a second base station based on the uplink measurements for the base stations in the set of base stations;
maintaining the downlink for the user device from the first base station based on the first base station increasing a number of antennas at the first base station used to service the downlink for the user device;
wherein a downlink region defined by the downlink for the user device is extended into an uplink region defined by the uplink for the user device as the user device moves into the uplink region to maintain the downlink for the user device.

19. The method of claim 18, wherein the first base station is a massive multiple input, multiple output (MIMO) base station.

20. The method of claim 19, wherein the downlink region is extended into the uplink region using beam forming.

* * * * *